United States Patent [19]
Acker et al.

[11] 3,795,336
[45] Mar. 5, 1974

[54] APPARATUS FOR TRANSPORTING BUILDING MODULES

[75] Inventors: Douglas B. Acker, San Francisco; Trevis L. Berry, Gilroy, both of Calif.

[73] Assignee: Reliance Trailer Manufacturing, Inc., San Francisco, Calif.

[22] Filed: Oct. 7, 1971

[21] Appl. No.: 187,357

[52] U.S. Cl............. 214/390, 214/1 H, 280/43.23, 52/143
[51] Int. Cl............................................ B60p 3/40
[58] Field of Search ..... 214/390, 392, 38 C, 38 CC, 214/512, 1 H; 280/43.11, 43.23; 52/143, 745, 749

[56] References Cited
UNITED STATES PATENTS

| | | | |
|---|---|---|---|
| 3,521,898 | 7/1970 | Fulmer et al. | 280/43.23 |
| 3,570,694 | 3/1971 | Tantlinger | 214/390 |
| 3,631,999 | 1/1972 | Walerowski | 214/390 |
| 3,270,900 | 9/1966 | Sherman | 214/620 X |
| 3,392,857 | 7/1968 | Tantlinger | 214/390 |
| 3,233,768 | 2/1966 | Turturro et al. | 52/745 X |

FOREIGN PATENTS OR APPLICATIONS

| | | | |
|---|---|---|---|
| 2,052,614 | 10/1970 | Germany | 214/390 |
| 859,759 | 1/1961 | Great Britain | 214/38 C |

*Primary Examiner*—Albert J. Makay
*Attorney, Agent, or Firm*—Townsend & Townsend

[57] ABSTRACT

A building module transporter for connection to a towing vehicle comprising a building module and module carriers attached to end walls of the module and resting on carrier supports. The carriers are firmly secured to the module at vertically spaced points to suspend the module between them and to permit the raising and lowering of the suspended module by pivoting the carriers about horizontal axes with respect to the supports. Means is provided for moving the module with respect to the carriers in a lateral direction to facilitate the precision alignment of the module with a foundation at the building site. The spaced connection points between the module and the carriers tension a lower portion of the suspended building and place an upper portion thereof in compression.

8 Claims, 6 Drawing Figures

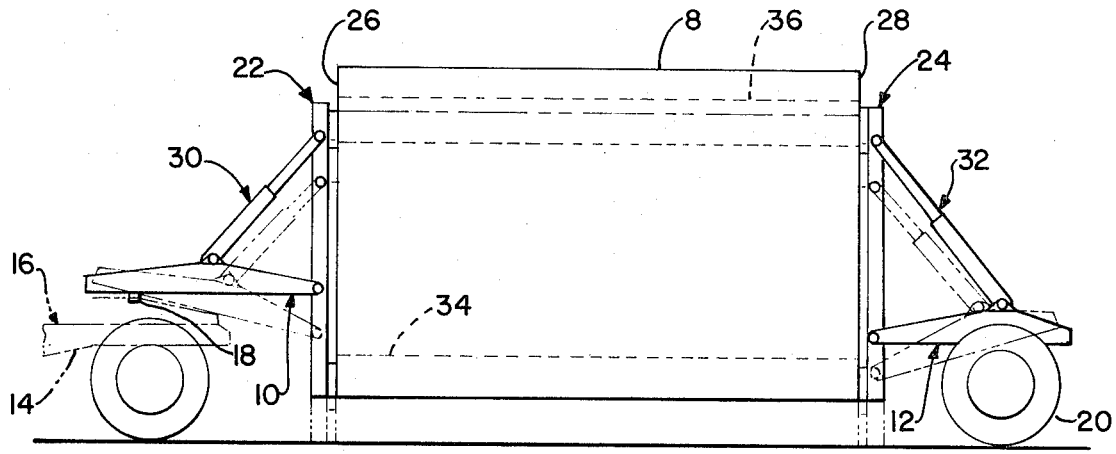
FIG_1
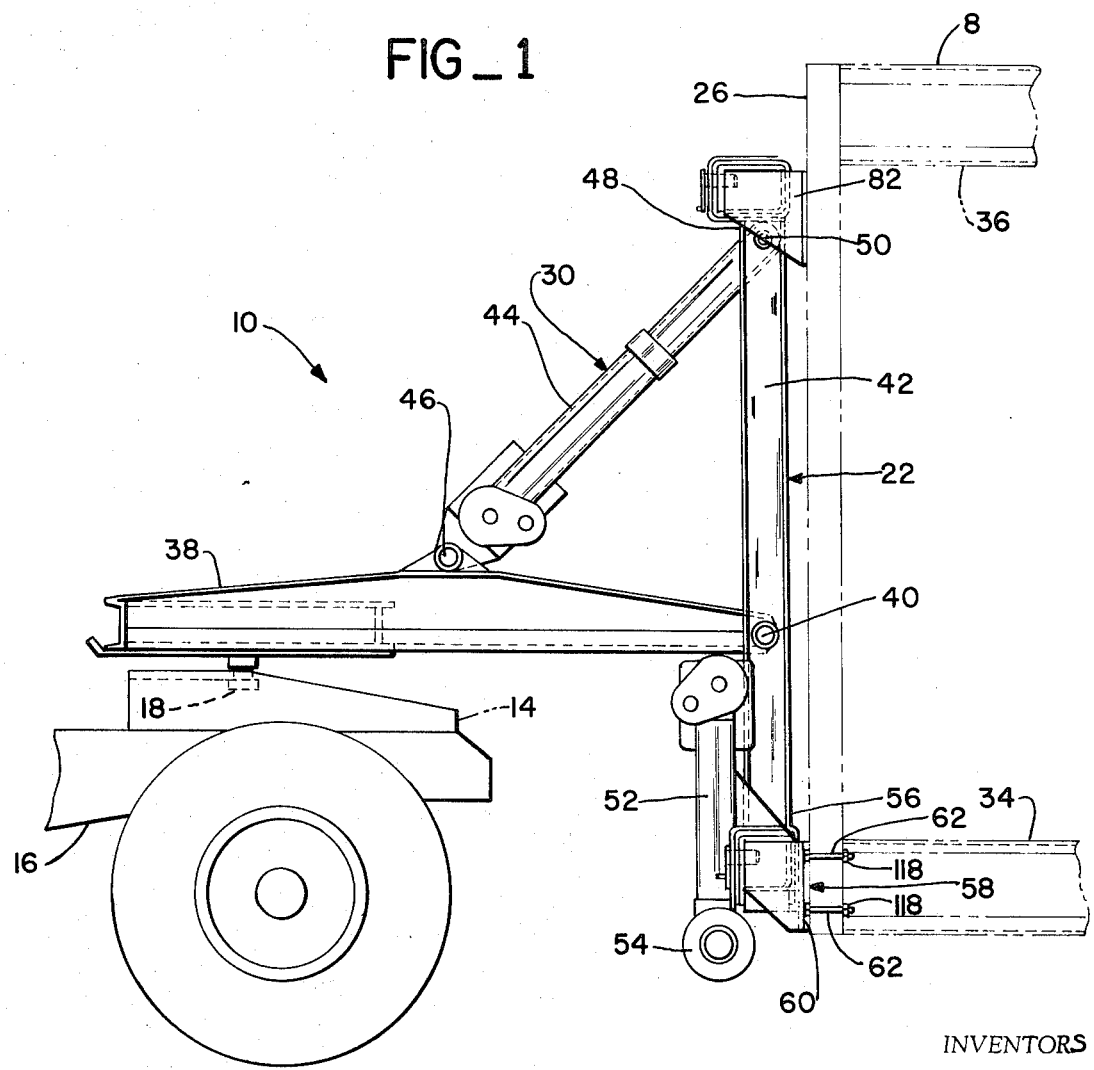
FIG_2
INVENTORS
DOUGLAS B. ACKER
TREVIS R. BERRY
BY Townsend and Townsend
ATTORNEYS PATENTED MAR 5 1974 3,795,336
SHEET 2 OF 3
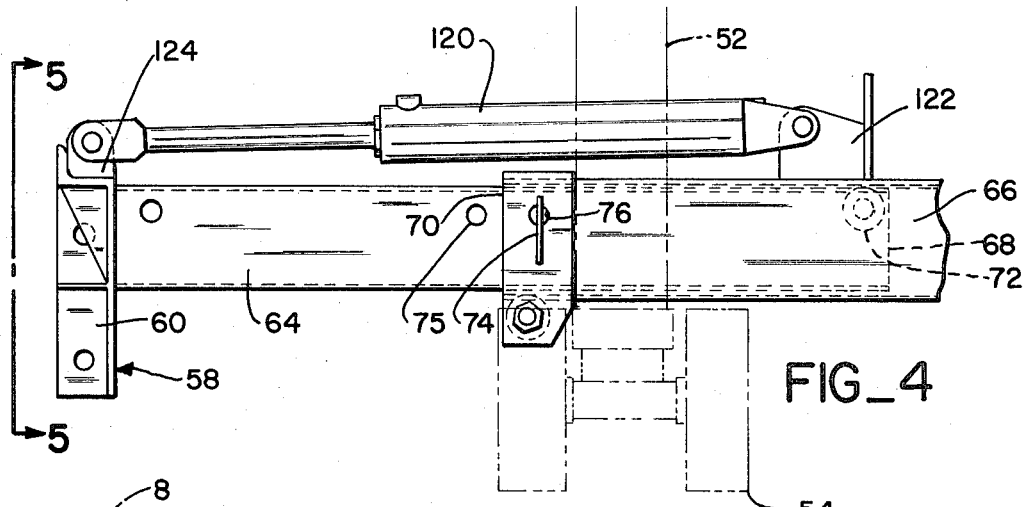
FIG_4
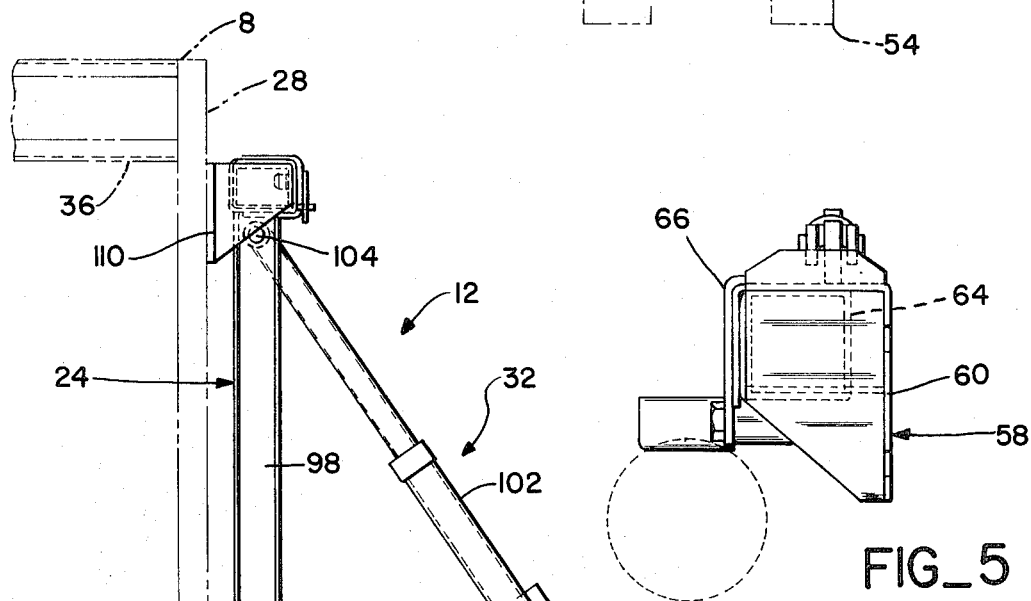
FIG_2B
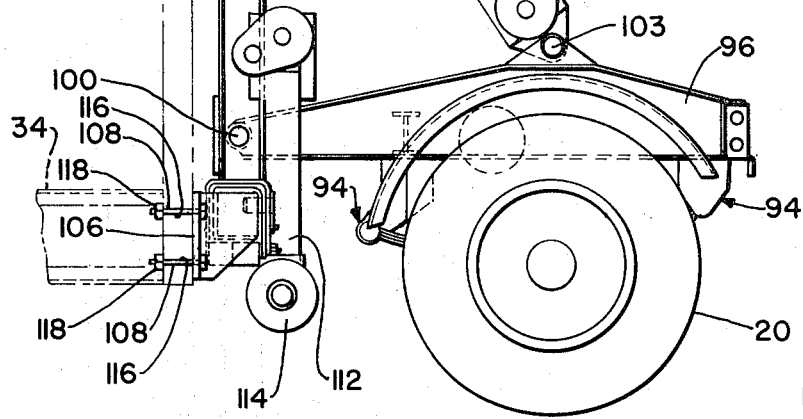
FIG_5
INVENTORS
DOUGLAS B. ACKER
TREVIS R. BERRY
BY
Townsend and Townsend
ATTORNEYS

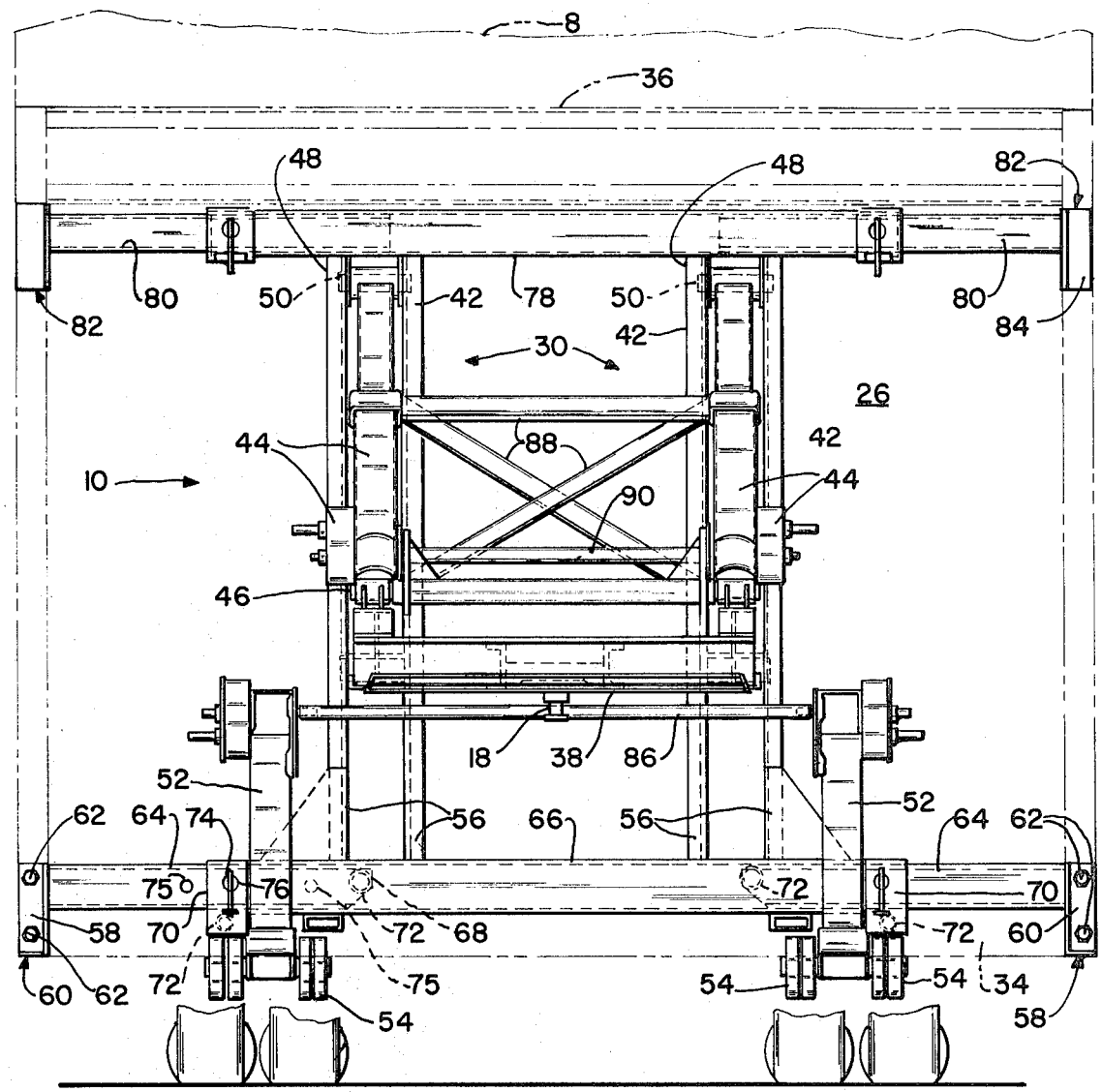
FIG_3

APPARATUS FOR TRANSPORTING BUILDING MODULES

BACKGROUND OF THE INVENTION

Attempts to reduce building costs have generally lead to the use of prefabricated houses. Frequently, prefabricated houses are too large for transport as a unit to the building site. Consequently, building modules are employed with increasing frequency.

Such building modules can be constructed in convenient sizes to enable their rail and/or truck transport to the building site. In the past, it has been common to load the building modules on flat bed trucks or the like and drive them to adjacent their permanent foundations at the building site. There conventional hoisting equipment such as a crane is necessary to lift the module off the truck and lower it onto the foundation. This ties up expensive hoisting equipment, requires special on-site installation of the crane, and is a slow and relatively cumbersome operation. Moreover, carelessness on the part of the operator can easily damage the module before it is placed on the foundation, thereby causing further cost increases in the construction of supposedly low cost housing.

To sum up, low housing costs are reduced through the use of building modules but transportation and installation techniques for such modules rely on conventional, cumbersome, and relatively expensive methods.

SUMMARY OF THE INVENTION

The present invention provides relatively inexpensive apparatus for transporting building modules and the like to an installation site and for setting the module on its foundation at the site without the need for additional high cost hoisting equipment. Generally speaking, in accordance with the invention the transportation and installation of building modules requires the steps of attaching a first carrier to a first module wall at vertically spaced locations and attaching a second carrier to a second module wall spaced from and substantially parallel to the first wall, supporting the carriers, and moving portions of the carrier attached to the walls upwardly to thereby suspend the module between the carriers and place a lower module portion in tension and an upper module portion in compression. The module is transported to the building site by moving one of the carriers and thereby towing the other carrier and the suspended module along.

At the building site the module can be aligned with its foundation by moving it laterally with respect to the carriers and it is placed on the foundation by pivoting portions of the carriers with the module suspended therebetween about horizontal axes until the module contacts and rests on the foundation.

Apparatus provided by the present invention comprises a first carrier for connection to a towing vehicle and to a wall defining one end of the module. A second carrier is releasably connected to another wall defining an opposite end of the module so that the carriers and the module form a unit in which the module is suspended between the carriers. The apparatus includes means for moving the suspended module in a lateral direction with respect to the carriers to permit the precision alignment of the module with the foundation and means for lowering the suspended module onto the foundation.

In the preferred embodiment of the invention upright posts or members which mount vertically spaced module wall connectors are pivotally mounted to a carrier platform at a point vertically between the connectors. The platform is further preferably pivotable about a horizontal axis parallel to the pivot axis of the upright posts and means is provided for pivoting the platform with respect to the upright posts. The lower connectors are bolted to a lower portion of the module, to place that portion in tension when the house is suspended between the carriers while the upper connectors are pivoted against the building wall through actuation of the pivoting means between the posts and the platform to place an upper portion of the module in compression. When the upper connectors engage the module walls continued lengthening or shortening of the means for pivoting the upright posts pivots the platform and thereby raises and lowers the module for pick-up of the module, lowering it onto the foundation at the building site and for adjusting the height above ground during transportation of the module to prevent damage to the module from contact with the ground during movements over uneven terrain.

The present invention eliminates the need for special hoisting equipment when loading the module at the point of its manufacture on its transport vehicle and when unloading it at the building site and placing it on top of its foundation. The towing apparatus for the module is relatively light weight since it employs the module itself as a self-supporting portion of a trailer unit. Substantial cost savings in the initial acquisition of transport means for the modules are thereby possible.

The module can be carrier as low above ground as permitted by the ground. Excessive heights, as encountered with prior art modules loaded onto flat bed trucks and the like, and which could result in damage to the module when passing low overhead crossings and the like, are eliminated. At the construction site, the apparatus of the invention permits a precision alignment of the module while still suspended on the carrying apparatus and, thereafter, the lowering of the module onto the foundation without the need for a crane or the like.

The connectors of each carrier are attached to a single wall only and do not protrude past sides of the module. Consequently, the overall width of the unit is no greater than the width of the building module. By limiting the building module width to a standard 8 feet, it can be moved on public highways without special moving permits. Furthermore, the connectors do not extend beneath the module since they are secured to the walls only, so that upon lowering the module onto the foundation the connectors can be disconnected from the module and the carriers can be withdrawn therefrom without interference from the module and without the need for again raising the module to allow removal of the carriers.

BRIEF DESCRIPTION OF THE DRAWINGS

FIG. 1 is a side elevational view of building module carriers constructed in accordance with the invention and illustrates the carriers and the module in phantom lines in a lowered position in which the latter rests on the ground;

FIGS. 2A and 2B are enlarged side elevational views of the forward and the aft carriers, respectively;

FIG. 3 is a rear elevational view of the forward carrier;

FIG. 4 is an enlarged rear elevational view of a lower member of the forward carrier which is bolted to the module and illustrates the means for moving the module lateral to the carriers; and FIG. 5 is a side elevational view and is taken on line 5—5 of FIG. 4.

DESCRIPTION OF THE PREFERRED EMBODIMENTS

Referring first to FIG. 1, a building module 8 is schematically illustrated suspended between a forward module carrier 10 and an aft module carrier 12. The forward carrier is supported on a fifth wheel 14 of a towing vehicle 16 via a downwardly extending connecting pin 18. The aft carrier is constructed as an independent trailer or dolly and conventionally mounts wheels 29. Support structures 22 and 24, respectively, for the modules are connected to the carriers and are secured to spaced apart, parallel, upright module end walls 26 and 28, respectively. Each carrier further includes means 30, 32, respectively, for raising the module from a ground-supported position (shown in phantom lines) into the position shown in solid lines in which the module is suspended between the carriers. When the module is so suspended between the carriers it is subjected to a bending moment. This bending moment places a lower or floor section 34 of the module in tension while an upper module section 36 adjacent the building ceiling is placed in compression.

Referring to FIGS. 2A, 2B and 3, forward carrier 10 is broadly constructed of a platform 38 from which pin 18 depends for connection to fifth wheel 14, and includes a first horizontal pivot axis defined by pivot pins 40 which pivotally engage a pair of spaced apart upright posts 42 of support structure 22. The upright posts extend above and below the pivot pins. A pair of telescoping actuators such as conventional mechanical truck jacks 44 are pivotally mounted to platform 38 with a pair of second horizontal pins 46 and to posts 42 adjacent their upper ends 48 by a pair of third, parallel and horizontal pins 50. For supporting the carrier in a generally horizontal position, spaced apart conventional truck jacks 52 are mounted to a horizontally disposed guide tube 66 secured to lower ends 56 of posts 42. Support wheels 54 can be lowered with jacks 52 until they touch ground and support platform 38 in a generally horizontal position.

When a building module 8 is suspended between forward and aft carriers 10 and 12, jacks 44 are usually positioned so that upright posts 42 are in a substantially vertical position. Module mounting assemblies 58 have mounting flanges 60 that are firmly secured to lower module portion 34 with a pair of spaced apart bolts 62. The mounted assemblies are carried by laterally extending hollow bars 64 that are telescopingly disposed interiorly of a horizontally disposed guide tube 66 secured to lower ends 56 of upright posts 42. An inside end 68 of bar 64 and outer ends 70 of guide tube 66, respectively, mount low friction rollers 72 which provide for rolling friction between the bars and the guide tubes when they are moved with respect to each other. Means such as lock pins 74 can further be provided for extension through bores 75, 76 for interlocking the bars and the guide tube at predetermined positions.

A guide tube 78 constructed substantially identical to lower guide tube 66 is secured to upper ends 48 of posts 42 and extends lateral thereof the same distance as the lower guide tube. A slide bar 80 extends from each end of the guide tube. Compression pads 82 are mounted to the outermost end of each slide bar. The compression pads are preferably defined by L-shaped members which terminate in flanges 84 that are biased against module side 26 as more fully described below.

A lock pin arrangement as described is preferably provided to lock the upper slide bars at predetermined positions. In contrast to the lower slide bar-guide tube arrangement, the upper slide bar-guide tube arrangement does not require rollers to reduce friction during relative movements between the bars and the tube. The force of friction between the guide bars and the tube as insignificant because the upper guide bars are withdrawn from contact with the building module during lateral movement of the module on the carrier of this invention.

When pin 18 is connected to the towing vehicle via fifth wheel 14, jacks 52 are actuated to lower wheels 54 until they contact the ground and platform 38 as disposed in a substantially horizontal position. To facilitate the simultaneous raising and lowering of the wheels secured to both jacks transverse shafts 86 connect the drive mechanism of the jacks so that actuation of one automatically actuates the other one. When the support jack wheels 54 are on the ground, actuation of jacks 44 of the raising and lowering mechanism 30 pivots upright posts 42 about pin 40. The actuators are interconnected and rigidified with a support frame work 88 disposed between them. Furthermore, a shaft 90 connects the drive mechanism of jacks 44 which causes the simultaneous and equal actuation of both jacks when one of them is actuated so that misalignment of support structure 22, cocking and possible damage are prevented.

To connect and disconnect forward carrier 10 with the towing vehicle, the former must be transported to and hoisted upon the fifth wheel of the latter. To facilitate this task, a pair of laterally spaced longitudinally oriented rectangularly tubular members 92 are secured to the underside of lower guide tube 66. A conventional forklift (not shown) can thus be employed for lifting and transporting the carrier to and from the vehicle. This substantially facilitates the ease and speed with which the carrier is connected to or disconnected from a vehicle.

Aft carrier 12 is of a substantially same construction as the forward carrier 10. The main distinguishing characteristic between the two is that wheels 20 are mounted to the aft carrier via mounting assembly 94 in a conventional fashion so that the aft carrier comprises a self-supporting trailer. Thus, the aft carrier includes a platform 96, upright posts 98 of aft support structure 24 pivotally mounted to the forward end of the platform with pivot pins 100, and actuators 102 pivotally secured to the platform and the upper end of upright posts 98 via pivot pins 103 and 104, respectively, for pivoting aft support structure 24 about pins 100. A guide tube is secured to lower ends of upright posts 98 and mounts laterally movable bars which, at their outermost end, mount flanges 106 rigidly secured to the lower end of building module 8 via bolts 108. Rollers (not shown in FIG. 2B) are again provided in the earlier described manner for reducing friction during relative movements of the laterally extending bars into and out of the lower guide tube.

A guide tube is also secured to the upper end of upright posts 98. Upper laterally extending and movable bars are disposed in the upper guide tube and mount compression pads 110.

The aft carrier further includes spaced apart vertically positioned jacks 112 having wheels 114 for supporting the platform in an essentially horizontal position during non-use of the carrier. The aft carrier is also provided with a rigidifying support frame (not shown in FIG. 2B) between actuators 102, interconnecting shafts for simultaneously operating the actuators as well as the vertical support jacks and, finally, laterally spaced, longitudinally extending rectangularly tubular forklift engaging members (not shown in FIG. 2B) to enable the handling of the aft carrier with conventional forklifts.

Turning now to the use of the building module carrier of the present invention and referring to FIGS. 1 through 5, forward carrier 10 is secured to a towing vehicle 16 by interengaging pin 18 with fifth wheel 14 and lowering vertical jacks 52 to support platform 38 in a horizontal position. The upright posts 42 and 98 of the forward and aft carriers 10, 12 are placed in vertical position by correspondingly operating actuators 44 and 102 and the carriers are placed against module sides 26, 28.

The prefabricated modules preferably include predrilled bores 116 through which bolts 62, 108 mounted to flanges 60, 106 can be extended. Preferably, nuts 118 are secured, e.g. welded to the module in alignment with the bore at the inner end of the bore so that the bolts can be simply threaded into engagement with the nuts. For proper alignment of the flanges, the flange mounting support bars are, of course, moved in and out of the guide tubes as required. For use of the carriers with standard module sizes properly positioned indexing bores 75 are provided in the bars. The indexing bores are then engaged with pins 74 to automatically align the flanges with the bores in the module to thereby eliminate tedious trial and error alignments.

After bolts 62, 108 have been tightened jacks 44 and 102 are actuated to extend them, that is to increase the distance between pivot pins 46, 48 and 103, 104, respectively, whereby the platforms 38, 96 are pivoted downwardly relative to upright posts 42, 98. Since wheels 20 of the aft carrier and fifth wheel 14 of the forward carrier are substantially rigid connections, that is they cannot be pushed downward, the relative movement between the upright posts and the platforms causes corresponding pivotal movements of the forward platform 38 about pin 18 and of the aft platform 96 about the center of wheel 20. The pivotal movements of the platform in turn raises the upight posts and, therewith of building module 8 to suspend the module between the carriers. After the module has been raised a sufficient distance above the ground support wheels 54, 114 of vertical jacks 52, 112, are retracted and the rig is ready for transporting the module to its installation site. During highway travel the module can be placed in the lowermost practical position for travel to prevent problems with low overhead obstructions. Once at the building site the terrain is frequently uneven, full of holes, loose soil, rocks, etc. To prevent damage to the module from contact with such uneven terrain jacks 44 and 102 are further extended to raise the building module sufficiently above ground to avoid such contact.

The vehicle driver now visually aligns his vehicle with the foundation for the module. Generally, the foundations for modular buildings are constructed to permit passage of vehicles through openings or cutouts in the foundation. After longitudinal alignment of the module with the foundation it is laterally aligned therewith by moving the module with respect to the carriers in a lateral direction. To facilitate such movement, a double acting hydraulic actuator 120 is provided for each module carrier. One end of the actuator (in FIG. 4 shown mounted to forward carrier 10) is secured to guide tube 66 via mounting bracket 122. The other end of the actuator is mounted to a tongue 124 secured to the outermost end of one of the sliding bar 64 adjacent module mounting assembly 58. A suitable hydraulic hand pump (not shown) is provided to operate the actuator. Retraction or extension of the actuator moves the building module in the lateral direction to the left or the right until the module is laterally aligned with the foundation.

Thereafter, jacks 44 and 102 are retracted to lower the module in a sequence opposite to the above described module raising sequence until the module rests on the foundation.

Jacks 52 are now lowered to support platforms 38 and 96, bolts 62 and 108 are backed off the nuts 118 and withdrawn, and the forward and aft carriers are pulled away from the building module without the need for raising the module to permit disengagement of the carriers. Thus, the carriers of the present invention not only provide for a relatively effortless and inexpensive way of transporting building modules but also provide means for aligning the module with the foundation and placing it thereon.

During the return trip of the towing vehicle and the empty carriers, aft carrier 12 is preferably secured to the forward carrier 10 by bolting the lower module mounting assemblies to each other in the same manner in which they were bolted to the lower end of the building module. For safety purposes a clamp or the like is provided to retain compression pads 82 and 110 to each other.

I claim:

1. Apparatus for transporting objects having oppositely disposed spaced upright end walls and capable of withstanding a bending moment comprising: a forward support connectable to a towing vehicle, the support having an upper member and a lower member, means for securing the lower member to one of the walls adjacent a lower end of the object, an aft support for placement adjacent the other wall of the object supported on the ground, the aft support having an upper member and a lower member, means for securing the lower member of the aft support to the other wall adjacent the lower end of the object so that the forward and aft supports are connected together only by the object, means for placing the upper member of the forward support and the upper member of the aft support against the respective walls of the object whereby the weight of the object subjects the object to a bending moment while suspended between the upper and lower members of the supports, and means for raising and lowering the object relative to the ground while suspended between and carried by the members, and means mounted to the supports for moving the object in a lateral direction in a substantially horizontal plane while the object is carried by and suspended between the members to facilitate alignment of the object with a predetermined location.

2. Apparatus according to claim 1 wherein the walls are substantially parallel and vertical, and wherein the upper and lower members of the supports include means for engaging the upright walls only, and wherein the securing means includes means permitting disengagement of the securing means from the object by moving the supports generally horizontally away from the object to enable the positioning of the object over a predetermined location, the lowering of the object onto a supporting surface at the location, and the ready removal of the supports from the object without lifting the object or the supports.

3. Apparatus according to claim 1 wherein the means for laterally moving the module includes means for moving the module in opposite directions.

4. Apparatus for transporting building modules and the like comprising: a forward unit having upper and lower module wall engaging members, the lower member including means for rigidly securing the lower member to a lower portion of the building, the upper member including means for contacting the module wall, and means for raising and lowering the members while in contact with the module wall; an aft unit having upper and lower module wall engaging members for placement adjacent a module wall opposite from the first mentioned module wall, means for rigidly securing the lower aft member to a lower portion of the module for tensioning a lower module portion by applying opposite forces to the lower members, the upper aft member including means for contacting the opposite wall, means for biasing the upper members against the module to place an upper module portion in compression when the lower portion is in tension and thereby suspend the module between the units, means for raising and lowering the upper and lower members of the aft unit in contact with the opposite module wall for raising and lowering of the module while suspended between the units, means for connecting the forward unit to a towing vehicle, means for movably supporting the aft unit, the engaging members of the forward and the aft units further including substantially horizontally disposed bars, means for connecting the bars with the module, and means permitting lateral motion of the bars with respect to the units to enable the precision lateral alignment of the module with a building foundation at the installation site.

5. Apparatus according to claim 4 including compression pads secured to the bars of the upper engaging members of the units for subjecting the upper module portion to compressive forces.

6. Apparatus according to claim 4 including vertically spaced apart guide means for the rails, and wherein the forward unit and the aft unit each include an upright support structure for the guide means.

7. Apparatus according to claim 6 wherein the biasing means comprises pivot means between the upper and the lower bars for pivotally securing each upright support structure to a generally horizontal platform of the respective unit, and means for pivotally moving the support structure to bias the upper bars against the module.

8. Apparatus according to claim 4 including means mounted to each unit defining spaced apart, substantially horizontally disposed channels for grasping the unit with a hoisting implement.

* * * * *